US010693229B2

(12) United States Patent
Grass et al.

(10) Patent No.: US 10,693,229 B2
(45) Date of Patent: Jun. 23, 2020

(54) ELECTRONICALLY PIVOTABLE ARRAY ANTENNA WITH BROADCAST-BASED CONTROL

(71) Applicant: IHP GMBH—INNOVATIONS FOR HIGH PERFORMANCE MICROELECTRONICS LEIBNIZ-INSTITUT FUR INNOVATIVE MIKROELEKTRONIK, Frankfurt (Oder) (DE)

(72) Inventors: Eckhard Grass, Berlin (DE); Chafik Meliani, Berlin (DE)

(73) Assignee: IHP GMBH—INNOVATIONS FOR HIGH PERFORMANCE MICROELECTRONICS/LEIBNIZ-INSTITUT FUR INNOVATIVE MIKROELEKTRONIK (DE)

( * ) Notice: Subject to any disclaimer, the term of this patent is extended or adjusted under 35 U.S.C. 154(b) by 436 days.

(21) Appl. No.: 14/894,069

(22) PCT Filed: May 27, 2014

(86) PCT No.: PCT/EP2014/060986
§ 371 (c)(1),
(2) Date: Jul. 8, 2016

(87) PCT Pub. No.: WO2014/191425
PCT Pub. Date: Dec. 4, 2014

(65) Prior Publication Data
US 2016/0315385 A1    Oct. 27, 2016

(30) Foreign Application Priority Data

May 27, 2013  (DE) .......................... 10 2013 209 844

(51) Int. Cl.
*H01Q 3/26* (2006.01)
*H01Q 3/36* (2006.01)
(Continued)

(52) U.S. Cl.
CPC ............. *H01Q 3/2676* (2013.01); *H01Q 3/36* (2013.01); *H01Q 23/00* (2013.01); *H04L 65/4076* (2013.01)

(58) Field of Classification Search
CPC ........ H01Q 3/005; H01Q 3/2676; H01Q 3/36; H04B 7/066
See application file for complete search history.

(56) References Cited

U.S. PATENT DOCUMENTS 5,029,306 A    7/1991  Bull et al.
5,051,754 A *  9/1991  Newberg ............. H01Q 3/2676
                                                                342/374
(Continued)

FOREIGN PATENT DOCUMENTS

DE    102009022158 A1    11/2010

OTHER PUBLICATIONS

Lee et al., "A Broadcast Reference Technique for Self-Calibrating of Large Antenna Phased Arrays," IEEE Transactions on Antennas and Propagation, vol. 37, No. 8, Aug. 1989 (Year: 1989).*
(Continued)

*Primary Examiner* — Daniel Munoz
(74) *Attorney, Agent, or Firm* — Ware, Fressola, Maguire & Barber LLP

(57) ABSTRACT

The present invention relates to a phased array antenna (10) with an electronically variable antenna pattern, wherein control signals for at least two phased antenna elements (13) are processed for a broadcast transmission and are broadcast to the phased antenna elements (13) via a wireless medium or using feed lines for useful signal components of the
(Continued)

phased antenna elements in a frequency band differing from the frequency band of the useful signal components. As a result of using the broadcast transmission in a different frequency band, there is no need for any additional signals or lines for the array antenna, and the complexity of the array antenna can be reduced and the flexibility and reconfigurability can be improved.

17 Claims, 2 Drawing Sheets

(51) Int. Cl.
    *H01Q 23/00*    (2006.01)
    *H04L 29/06*    (2006.01)

(56) References Cited

U.S. PATENT DOCUMENTS

| | | |
|---|---|---|
| 5,821,901 A | 10/1998 | Zagrodnick et al. |
| 5,986,590 A | 11/1999 | Smith et al. |
| 6,002,365 A * | 12/1999 | Page ............... H01Q 3/2676 342/375 |
| 2005/0253764 A1 | 11/2005 | Lee |
| 2009/0256748 A1 | 10/2009 | Alm et al. |
| 2014/0242918 A1* | 8/2014 | Weissman ............ H01Q 3/26 455/67.14 |

OTHER PUBLICATIONS

Toshihiko Nishimura, et al.; "Beam Scan Using the Quasi-Optical Antenna Mixer Array;" IEEE Transactions on Antennas and Propagation; Jul. 1, 1999; pp. 1160-1166.

Yen-Horng Chen, et al; "Active phase array using injection-locked oscillators;" Microwave Conference, 2001; APMC 2001; Dec. 3-6, 2001; vol. 2, pp. 819-822.

EP Office Action dated Jul. 1, 2019 issued by the EPO in corresponding EP Patent Application No. 14726978.1, 9 pages.

* cited by examiner

ELECTRONICALLY PIVOTABLE ARRAY ANTENNA WITH BROADCAST-BASED CONTROL

CROSS REFERENCE TO RELATED APPLICATIONS

This application is the U.S. National Stage of International Application Number PCT/EP2014/060986 filed on May 27, 2014 which application claims priority under 35 USC § 119 to German Patent Application No. 102013209844.8 filed on May 27, 2013. Both applications are hereby incorporated by reference in their entirety.

TECHNICAL FIELD

The invention relates to a phased array antenna with an electronically variable antenna pattern and to a method for electronic controlling the antenna pattern of such a phased array antenna.

BACKGROUND OF THE INVENTION

In a phased array antenna, the radiated energy is directionally concentrated by arranging and combining individual antenna elements (single antennas). When the single antennas can be controlled differently, the antenna pattern of the antennas is electronically pivotable. Directional concentration is all the stronger, the greater the transverse extension of the antenna. In two-dimensional antenna arrays, the antenna pattern can be concentrated in the vertical direction and in the horizontal direction. The antenna pattern also called the radiation pattern) can be asymmetrically controlled by controlling the difference in phase position.

Such an array antenna uses phase shifting among the transmitter elements arranged in a matrix in order to achieve directional concentration by interference. The transmission energy is intensified in the desired direction, whereas the undesired directions are cancelled by destructive interference. The individual antenna elements themselves do not need any devices for concentrating the beam directionally.

If a different phase difference is set, for example by adjusting the phase angle of the outer elements to lag and that of the inner elements to lead, the directional concentration of the antenna as a whole is altered, which means the shape of the antenna pattern changes. To obtain a very narrow antenna pattern, very many antenna elements are needed, with the phase differences between the emitters being added toward the edge of the antenna group. The phase shifters used for phase shifting must thus achieve a phase shift of almost 360°, and that phase shift must be implemented extremely fast. In practice, different delay elements are used that are connected to the feed line, for example in steps of 22.5° in the case of a 4-bit phase shifter with a 16-bit control word. The control word may also contain addressing information.

Linear array antennas are composed of rows that can be jointly controlled by a phase shifter. Phase shifters can be realized, also as delay elements, in a manner known per se. Planar array antennas may be composed of individual elements each with one phase shifter per element. The elements are arranged as in a matrix, the array antenna as a whole being formed by the planar arrangement of all the elements.

Array antennas may be fed via a feed line, in which case the energy is fed in series or in parallel to the antenna elements through coaxial cables, waveguides or other high-frequency feed lines (HF feed lines).

Alternatively, energy may also be fed by a central emitter, i.e., with energy that has already been radiated. These are then radiation-fed array antennas.

A distinction is also made between a series-fed array, in which the radiator elements are supplied consecutively with transmission power and with increasing phase shift through increasingly long feed lines, and parallel-fed arrays, in which each radiator element is supplied through an equally long feed line and therefore with the same phase. In the case of parallel-fed arrays, the length of the feed lines can therefore be ignored when calculating the phase shift.

Phased array antennas thus allow electromagnetic waves to be concentrated and electronically controlled in a specific direction. Such directional radiation is also referred to as beamforming. Beamforming can be used to increase the distance covered by wireless data transmission or by a radar application, and to reduce both interference and multipath propagation. In the case of radar applications, spatial resolution of the radar echo can be achieved with the aid of beamforming.

In order to achieve antenna patterns that are as sharply concentrated as possible, phased array antennas are preferably equipped with a plurality of antenna elements (1024, for example). The phase and amplitude can typically be separately adjustable for each single antenna element, for electronically adjusting the beam direction. As already mentioned, digital control signals are typically guided for that purpose to a plurality of phase shifter circuits (for example, 1024). This distribution of the digital control information requires a plurality of feed lines and therefore a complicated antenna module layout. If necessary, additional layers of metal must be provided for feeding the respective digital signals, as a result of which the production effort is increased.

Documents U.S. Pat. Nos. 5,821,901 and 5,986,590 disclose a phased array antenna in which the control signals are modulated on the same carrier frequency as the useful high-frequency (HF) signals to be transmitted. This involves complex modulation and circuitry to ensure separation between useful signals and control signals.

SUMMARY OF THE INVENTION

The object of the present invention is to provide a phased array antenna and a control method for such an array antenna, with which the circuitry complexity required to feed the control information can be reduced.

According to a first aspect of the present invention, a phased array antenna with an electronically variable antenna pattern is proposed, comprising at least two phased antenna elements for transmitting or receiving useful signal components having different phase positions via at least two phase control elements; and at least two receiver elements assigned to said phase control elements for receiving broadcast control signals for said phase control elements in a frequency band differing from the frequency band of the useful signal components.

According to a second aspect of the present invention, a controller for controlling the phased array antenna is proposed, comprising an interface for receiving control signals for at least two phased antenna elements, a signal processing unit for processing the control signals for a broadcast transmission to the phased array antenna, and a transmitter unit for broadcasting the processed control signals to the phased array antenna in a frequency band differing from the frequency band of useful signal components of the array antenna.

According to a third aspect of the present invention, a method for electronically controlling the antenna pattern of a phased array antenna is proposed, comprising the steps of receiving control signals for at least two phased antenna elements, processing the control signals for a broadcast transmission to the phased antenna elements; and broadcasting the processed control signals to the phased antenna elements via a wireless medium or using feed lines for useful signal components of the phased antenna elements in a frequency band differing from the frequency band of the useful signal components.

According to the aforementioned aspects of the present invention, the control signals are fed using a broadcast method in a frequency band differing from the frequency band of the useful signal components. This obviates the need for additional signals and lines on the antenna module, and the control information can be detected and received in a simple manner. More specifically, the digital control information can be transmitted via the HF lines that are present anyhow, using radio transmission or using optical free-space transmission, to the control circuits of the antenna elements. Data can thus be transmitted to the antenna elements of the phased array antenna optically or wirelessly using separate transmitter elements (antennas and/or optical transmitters) or by wired transmission using a frequency division multiplexing method, with the aim of minimizing the number of feed lines to the antenna elements and improving the flexibility and reconfigurability. It is thus possible to minimize the number of metal layers required for control lines in the antenna module. Effects on the radiation characteristics (antenna pattern) of the antenna elements due to additional lines can also be reduced.

For broadcast transmission of radio signals, the receiver elements of the phased array antenna may have their own receiver antennas for the control information. Accordingly, the transmitter unit of the controller may have its own antenna for wireless transmission of the processed control signals.

In optical broadcast transmission, the receiver elements of the array antenna may have optical detectors, such as photodiodes or the like. In that case, the transmitter unit of the controller may then be configured for optical transmission of the processed control signals, using an optical transmitter, for example.

In broadcast transmission of the control signals using the available feed lines for useful signal components of the phased antenna elements, the receiver elements of the array antenna may be configured to detect the broadcast control signals. The signal processing unit of the controller may be configured to switch the array antenna, by feeding it a configuration control signal, into a configuration in which the feed lines are released for transmission of the processed control signals, in order to avoid mutual interference between the useful signal components and the control signals. The signal processing unit can be then configured, preferably, to modulate the processed control signals onto a carrier frequency using a keying method of modulation, wherein the control signals are broadcast using frequency division multiplexing in a predetermined frequency band.

The array antenna may be configured to switch to a configuration mode in response to the configuration control signal. The array antenna can also be configured to release the feed lines for the useful signal components in the configuration mode for transmitting the control signals. In that case, the receiver elements can preferably be configured then to recover a clock signal on the basis of the broadcast control signals.

When the control signals are broadcast using a frequency division multiplexing method, the receiver elements may be configured to detect the broadcast control signals via a filter operation in a predetermined frequency band. The filter operation may preferably be low-pass filtering.

In one advantageous development of the invention, the receiver elements of the array antenna may be configured as routers for receiving and forwarding the control signals in a broadcast, multicast or unicast operating mode.

BRIEF DESCRIPTION OF THE DRAWINGS

The features and advantages of the array antenna according to the invention shall now be described in more detail with a description of the embodiments and with reference to the attached Figures, in which.

DETAILED DESCRIPTION

Embodiments shall now be described, based on a phased array antenna with broadcast control information for controlling phase shifter circuits in elements of the array antenna.

Figure 1:
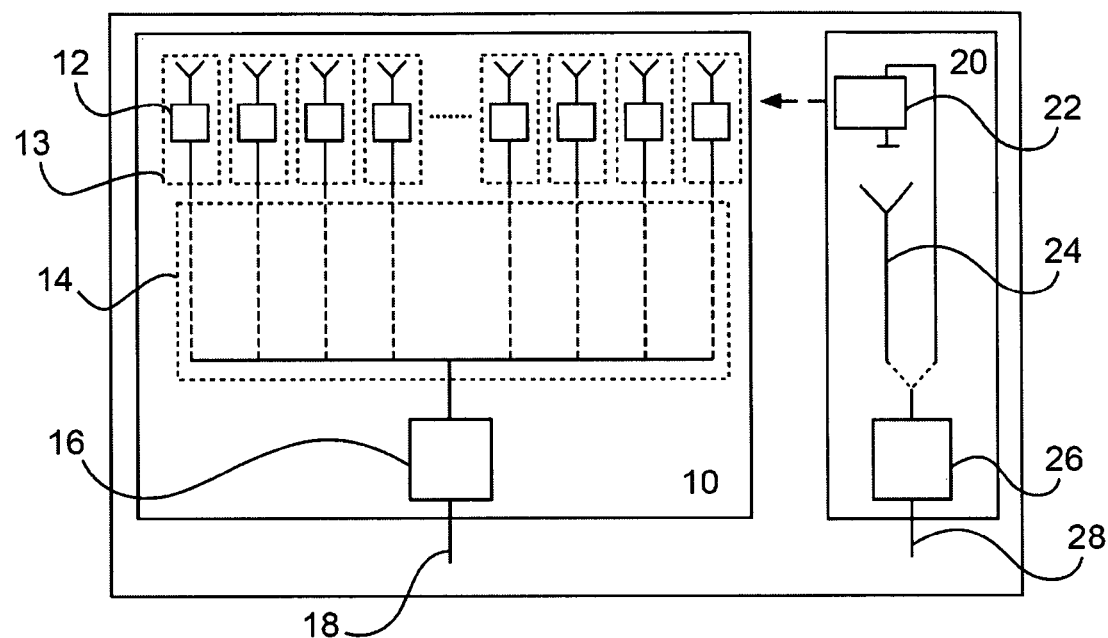
FIG. 1 shows a schematic block diagram of an array antenna system according to various embodiments of the present invention.

FIG. 1 shows a schematic block diagram of an array antenna system, comprising a phased array antenna 10 and a controller module 20 for broadcasting the control information in a frequency band differing from the frequency band of the useful signal components of array antenna 10.

According to FIG. 1, phased array antenna 10 has a plurality of phased array antenna elements 13, each having an HF output stage 12 with a receiver part for for receiving the broadcast control information and a phase shifter which is controlled according to the received control information. Array antenna elements 13 are fed in parallel via HF feed lines 14 from an HF unit 16 for the whole module, the useful signal to be transmitted being fed via an HF input 18. When a signal is being received, the useful signal components from the separate array antenna elements 13 are combined in HF unit 16 and provided via a respective signal output, which can be the same as the aforementioned HF input 18.

Controller module 20 has an input or interface 28 for feeding the control information to be broadcast for the phase shifters of array antenna elements 13. In a signal processing device 26, the control information supplied is encoded and processed for wired or wireless broadcast transmission. In the case of wireless broadcast transmission, the processed control information is fed to an antenna 24, via which the processed control information is then transmitted to the receiver parts of the individual array antenna elements 13. In the case of optical broadcast transmission, the processed control information is fed to a transmitter unit 22, which has an electro-optical transducer for emitting a respective optical signal, or an HF transmitter for feeding the control information to be broadcast into the HF feed lines 14 of array antenna elements 13 in a frequency band differing from the frequency band of the useful signal components of array antenna 10. In the latter case, the control information to be broadcast can be fed to array antenna 10 via the HF unit 16 of the module as a whole.

The array antenna system shown in FIG. 1 may thus provide a combination of all the broadcast transmission options, with the possibility of switching between them, or just one of the aforementioned broadcast transmission options. The former case provides the advantage of redundancy in the event of a malfunction on one or two of the aforementioned alternative broadcast transmission paths.

Figure 2:
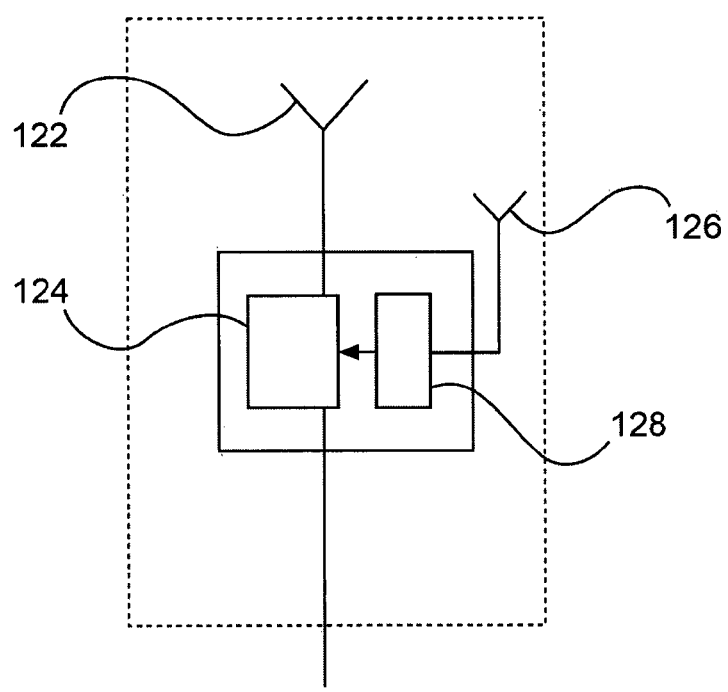
FIG. 2 shows an array antenna element with wireless control according to a first embodiment of the present invention.

FIG. 2 shows a more detailed schematic block diagram of an array antenna element 13 from FIG. 1 for the wireless control option, in which the control information is broadcast as a radio signal. The phased array antenna element according to FIG. 2 has an antenna element (single antenna) 122 which is fed a phase-controlled signal via an HF output stage 124. The phase control is performed by a control unit 128 with its own radio antenna 126 for the broadcast control information.

The broadcast control information from controller module 20 in FIG. 1 can thus be received via radio antenna 126 and used, by means of control unit 128, to control the phase and/or the amplitude of the useful signal components fed via HF feed lines 14. Control unit 128 can be configured to receive and extract the control information intended for the respective antenna element 122 (e.g., on the basis of address or selection information received) and to generate and apply a corresponding digital control word to a digital phase shifter provided in HF output stage 124. Thus, control unit 128 with radio antenna 126 also forms a receiver element for the broadcast control information and is assigned to the phase shifter in HF output stage 124.

Other phase shifter options involving switched feed lines of different length are also conceivable, of course.

According to the first embodiment, therefore, it is possible for the configuration and information data to be transmitted wirelessly, using separate antenna 126, on a different for example, higher) frequency than the frequency of the useful signal. Transmission between controller module 20 and array antenna 10 can be unidirectional transmission of the control information (e.g., selection and configuration data). However, it can also be bidirectional transmission of the control information in one direction (to array antenna 10) and receiver parameters (such as received signal strength indication (RSSI), temperature, health test data, calibration, etc.) in the opposition direction (to controller module 20). Backward transmission can be performed on a different frequency from forward transmission. The clock signal provided can also be modified according to the direction of transmission, with one clock signal being provided on a permanent basis using a DC voltage level, and with the supplied clock signal being switched to a clock signal in the HF range (60 gigahertz, for example), if HF module 124 wishes to transmit Information to controller module 20 shown in FIG. 1.

HF output stage 124 may also be configured, in combination with control unit 128 and radio antenna 126, as a router, so that the individual array antenna elements 13 in FIG. 1 can be integrated in a router architecture and can exchange information among each other using broadcast, multicast or unicast transmission. This allows specific, flexible and efficient transmission of the control information to the individual array antenna elements 13.

In order to enhance the reliability of transmission and to reduce any susceptibility to interference, the control information containing the configuration data can also be transmitted using code division multiplexing and spreading codes.

The advantageous developments mentioned in the foregoing, in combination with the configuration of HF output stage 124 and control unit 128, and the transmission of the control information, are also transferable to the following embodiments, so they are not mentioned again to avoid repetition.

Figure 3:
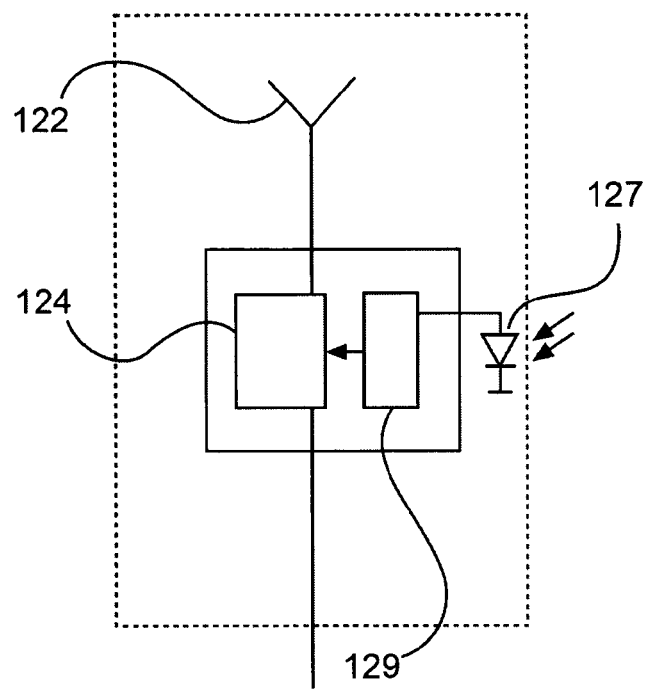
FIG. 3 shows an array antenna element with optical control according to a second embodiment of the present invention.

FIG. 3 shows a more detailed schematic block diagram of an array antenna element with optical control based on the broadcast control information according to a second embodiment. Antenna element (single antenna) 122 is fed via an HF output stage 124, which receives the broadcast control information via a control unit 129, wherein said control unit 129 has a photodetector 127 (for example, a photodiode or some other optoelectrical transducer element) for receiving an optical signal broadcast from transmitter unit 22 of controller module 20. The invention-related manner in which HF output stage 124 and controller module 129 operate is substantially the same as the manner in which HF output stage 124 and control unit 128 in FIG. 2 operate, as described in connection with the first embodiment. Control unit 129 may be configured differently from the latter in order to subject the signal received from photodetector 127 to a signal forming operation in order to acquire the broadcast digital control information. Control unit 129 with photodetector 127 thus forms a receiver element for the broadcast control information and is assigned to the phase shifter in HF output stage 124. The same signal processing can also be provided in the first embodiment, of course.

Figure 4:
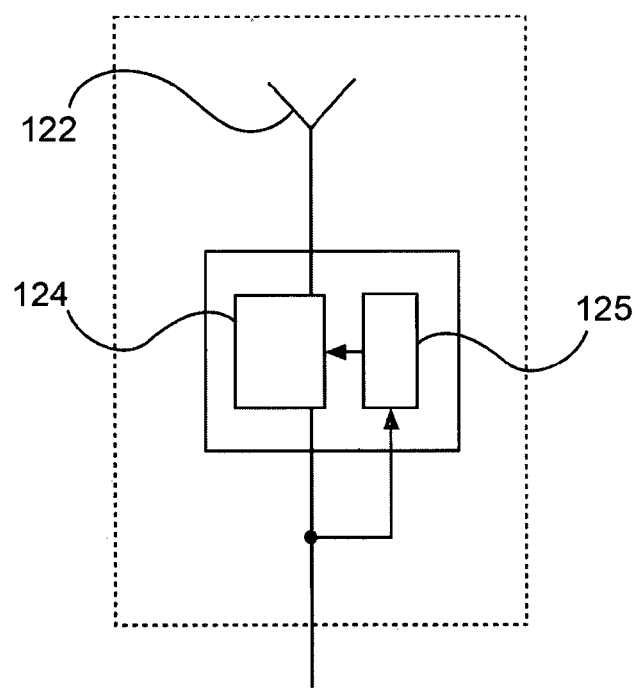
FIG. 4 shows an array antenna element with signal extraction according to a third embodiment of the present invention.

FIG. 4 shows a more detailed schematic block diagram of an array antenna element with signal extraction according to a third embodiment.

In the third embodiment, broadcast transmission of the control information from controller module 20 in FIG. 1 to the phased array antenna 10 is via the HF feed lines 14 already provided, according to FIG. 1, so the control information is provided at the array antenna element by signal extraction or detection on the individual HF feed lines 14 of the respective array antenna element. For this purpose, HF output stage 124 of the phased array antenna element is controlled by a control unit 125, to which the signals are fed on HF feed lines 14 and which is configured to extract or detect the broadcast control information from the signals on HF feed lines 14. The control information for the various array elements 13 can be transmitted as a stream of serial data via HF feed lines 14. Alternatively, an additional configuration control signal may be provided, with which array antenna 10 can be switched into a configuration mode. One way of doing this is for array antenna 10 to release HF feed lines 14, in response to the configuration control signal, for transmission of the broadcast control information. For example, HF unit 16 for the module as a whole may be configured to disconnect HF input 18 in response to the configuration control signal and to connect the output signal of transmitter unit 22 of controller module 20 through to HF feed lines 14.

The broadcast control information can be transmitted via. HF feed lines 14 to array antenna elements 13 by means of a simple keying modulation method, such as on-off keying (OOK), using a carrier frequency different from the normal carrier frequency of the useful signal. A clock signal can be recovered from the modulated received signal in control units 125, using power detection, for example. Control unit 125 thus forms a receiver element for the broadcast control information and is assigned to the phase shifter in HF output stage 124.

The modulated signals of the broadcast control information are transmitted in the separate frequency band on HF feed lines 14 using a frequency division multiplexing method. This frequency band may be a frequency band of low frequency and including a DC voltage, and energy consumption can be advantageously optimized by using higher impedances at lower frequencies. The broadcast control information is thus transmitted as a baseband signal and can be extracted in control unit 125 by means of an appropriate filter (low-pass filter).

Such transmission with frequency division multiplexing obviates any need to switch into the configuration mode, as described in the foregoing, because the possibility of simultaneously transmitting and receiving in the frequency band of the useful signal and configuring the array antenna elements can be realized.

Broadcast transmission of the control information in accordance with the embodiments described in the foregoing thus chows a reduction in the number of physical lines in the array antenna and thus a reduction in hardware, which results in an improvement in the form factor of such a chip module. Using a different frequency band to transmit the control information results in simplified extraction of the control information at the respective control units of the antenna elements. When the router architecture described in the foregoing is used, it is also possible to reduce the digital activity of the antenna system, as a result of which the electromagnetic compatibility is improved by reduced interference when configuration and HF operation of the array antenna are simultaneous. Similar advantages also result from optical transmission and when wireless transmission is split among separate antennas.

Hybrid variants are also conceivable by combining the aforementioned embodiments. For example, information may be transmitted from controller module 20 to array antenna 10 using a first transmission method (e.g., optical transmission) and in the reverse direction using a second transmission method (e.g., by radio or via the available feed lines). Clocking can also be provided using a separate transmission method.

As already mentioned, broadcast transmission of the control information for the array antenna elements, as described in the foregoing, can also be applied to receiver array antennas with controllable receiver characteristics (antenna pattern). In that case, the HF output stages 2 in FIG. 1 can be designed as HF transceiver modules which control the phase and amplitude of both the transmitted signal and the received signal.

The array antenna system according to FIG. 1, as described in the foregoing, may be designed as an integrated system in which both controller module 20 and phased array antenna 10 are integrated on the same chip module. Alternatively, controller module 20 can also be embodied on a separate chip or as a separate circuit or as a separate device.

The present invention has been described in summarized form in the foregoing with reference to embodiments containing a phased array antenna 10 with an electronically variable antenna pattern, wherein control signals for at least two phased antenna elements 13 are processed for a broadcast transmission and are broadcast to the phased antenna elements 13 via a wireless medium or using feed lines for useful signal components of the phased antenna elements in a frequency band differing from the frequency band of the useful signal components of the array antenna 10. As a result of using the broadcast transmission in a different frequency band, there is no need for any additional signals or lines for the array antenna, and the complexity of the array antenna can be reduced and the flexibility and reconfigurability can be improved.

The invention claimed is:

1. A phased array antenna with an electronically variable antenna pattern, comprising:
   at least two phased antenna elements for transmitting or receiving useful signal components having different phase positions via at least two phase control elements; and
   at least two receiver elements assigned to said phase control elements, for receiving the same broadcast control signal for all of said phase control elements in a frequency band differing from the frequency band of the useful signal components, wherein the receiver elements are configured to detect the broadcast control signals on feed lines for the useful signal components of the phased antenna elements.

2. The array antenna according to claim 1, wherein the receiver elements have receiver antennas for receiving the broadcast signals as radio signals.

3. The array antenna according to claim 1, wherein the receiver elements have optical detectors for receiving the broadcast signals as optical signals.

4. The array antenna according to claim 3, wherein the optical detectors have photodiodes.

5. The array antenna according to claim 1, wherein the array antenna is configured to switch to a configuration mode in response to receiving a configuration control signal.

6. The array antenna according to claim 5, wherein the array antenna is configured to release the feed lines for the useful signal components in the configuration mode for transmitting the control signals.

7. The array antenna according to claim 1, wherein the receiver elements are configured to recover a clock signal on the basis of the control signals.

8. The array antenna according to claim 1, wherein the receiver elements are configured to detect the broadcast control signals via a filter operation in a predetermined frequency band.

9. The array antenna according to claim 8, wherein the filter operation is low-pass filtering.

10. The array antenna according to claim 1, wherein the receiver elements are configured as routers for receiving and forwarding the control signals in a broadcast, multicast or unicast operating mode.

11. A controller for controlling a phased array antenna with an electronically variable antenna pattern, comprising:
    an interface for receiving a control signal for at least two phased antenna elements for transmitting or receiving useful signal components having different phase positions via at least two phase control elements;
    a signal processing unit for processing the control signal for a broadcast transmission to the phased array antenna; and
    a transmitter unit for broadcasting the same processed control signal to the phased array antenna for all of said phase control elements in a frequency band differing from the frequency band of useful signal components of the array antenna,
    wherein the transmitter unit is configured to broadcast the processed control signals via feed lines for useful signal components of the phased array antenna.

12. The controller according to claim 11, wherein the signal processing unit is configured to switch the array antenna, by feeding it a configuration control signal, into a configuration in which the feed lines are released for transmission of the processed control signals.

13. The controller according to claim 11, wherein the signal processing unit is configured to modulate the processed control signals onto a carrier frequency of the different frequency band using a keying method of modulation.

14. The controller according to claim 11, wherein the transmitter unit is configured for optical transmission of the processed control signal.

15. The controller according to claim 11, wherein the transmitter unit includes an antenna for wireless transmission of the processed control signal.

16. An array antenna system comprising a phased array antenna with an electronically variable antenna pattern, comprising:
- at least two phased antenna elements for transmitting or receiving useful signal components having different phase positions via at least two phase control elements; and
- at least two receiver elements assigned to said phase control elements, for receiving broadcast control signals for said phase control elements in a frequency band differing from the frequency band of the useful signal components; and
- a controller according to claim 11 for controlling the array antenna.

17. A method for electronically controlling the antenna pattern of a phased array antenna, comprising the steps of:
- receiving a control signal for at least two phased antenna elements for transmitting or receiving useful signal components having different phase positions via at least two phase control elements;
- processing the control signal for a broadcast to the phased antenna elements; and
- broadcasting the same processed control signal for all of said phase control elements to the phased antenna elements using feed lines for the useful signal components of the phased antenna elements, in a frequency band differing from the frequency band of the useful signal components.

\* \* \* \* \*